(12) United States Patent
Sugawara

(10) Patent No.: US 10,394,498 B2
(45) Date of Patent: Aug. 27, 2019

(54) PRINT CONTROL APPARATUS, CONTROL METHOD AND STORAGE MEDIUM FOR CONTROLLING ENCRYPTED COMMUNICATION AND PRINT PROCESSING

(71) Applicant: CANON KABUSHIKI KAISHA, Tokyo (JP)

(72) Inventor: Wahei Sugawara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/996,318

(22) Filed: Jun. 1, 2018

(65) Prior Publication Data

US 2018/0364956 A1    Dec. 20, 2018

(30) Foreign Application Priority Data

Jun. 16, 2017    (JP) .................................. 2017-119068

(51) Int. Cl.
| | |
|---|---|
| *G06F 15/00* | (2006.01) |
| *G06K 1/00* | (2006.01) |
| *G06K 15/00* | (2006.01) |
| *G06F 3/12* | (2006.01) |
| *H04L 9/08* | (2006.01) |

(52) U.S. Cl.
CPC .......... *G06F 3/1222* (2013.01); *G06F 3/1215* (2013.01); *G06F 3/1236* (2013.01); *G06F 3/1238* (2013.01); *G06F 3/1285* (2013.01); *H04L 9/0819* (2013.01); *H04L 9/0825* (2013.01); *G06F 3/1263* (2013.01)

(58) Field of Classification Search
CPC .... G06F 3/1222; G06F 3/1238; G06F 3/1215; G06F 3/1236; G06F 3/1285; G06F 3/1263; H04L 9/0819; H04L 9/0825
USPC ........................................ 358/1.1, 1.14, 1.15
See application file for complete search history.

(56) References Cited

U.S. PATENT DOCUMENTS

| | | | | |
|---|---|---|---|---|
| 2002/0010854 | A1* | 1/2002 | Ogura ................ | H04N 1/00888 713/100 |
| 2003/0217262 | A1* | 11/2003 | Kawai ................. | H04L 63/0428 713/153 |

FOREIGN PATENT DOCUMENTS

JP        2017-69756 A    4/2017

\* cited by examiner

*Primary Examiner* — Douglas Q Tran
(74) *Attorney, Agent, or Firm* — Canon U.S.A., Inc. IP Division

(57) ABSTRACT

An apparatus assigns a communication control unit with a first priority as a priority when the communication control unit decrypts an encrypted common key and assigns a print control unit with a second priority higher than the first priority. Resource distribution of the apparatus with respect to the communication control unit and the print control unit is determined according to the priorities.

18 Claims, 7 Drawing Sheets

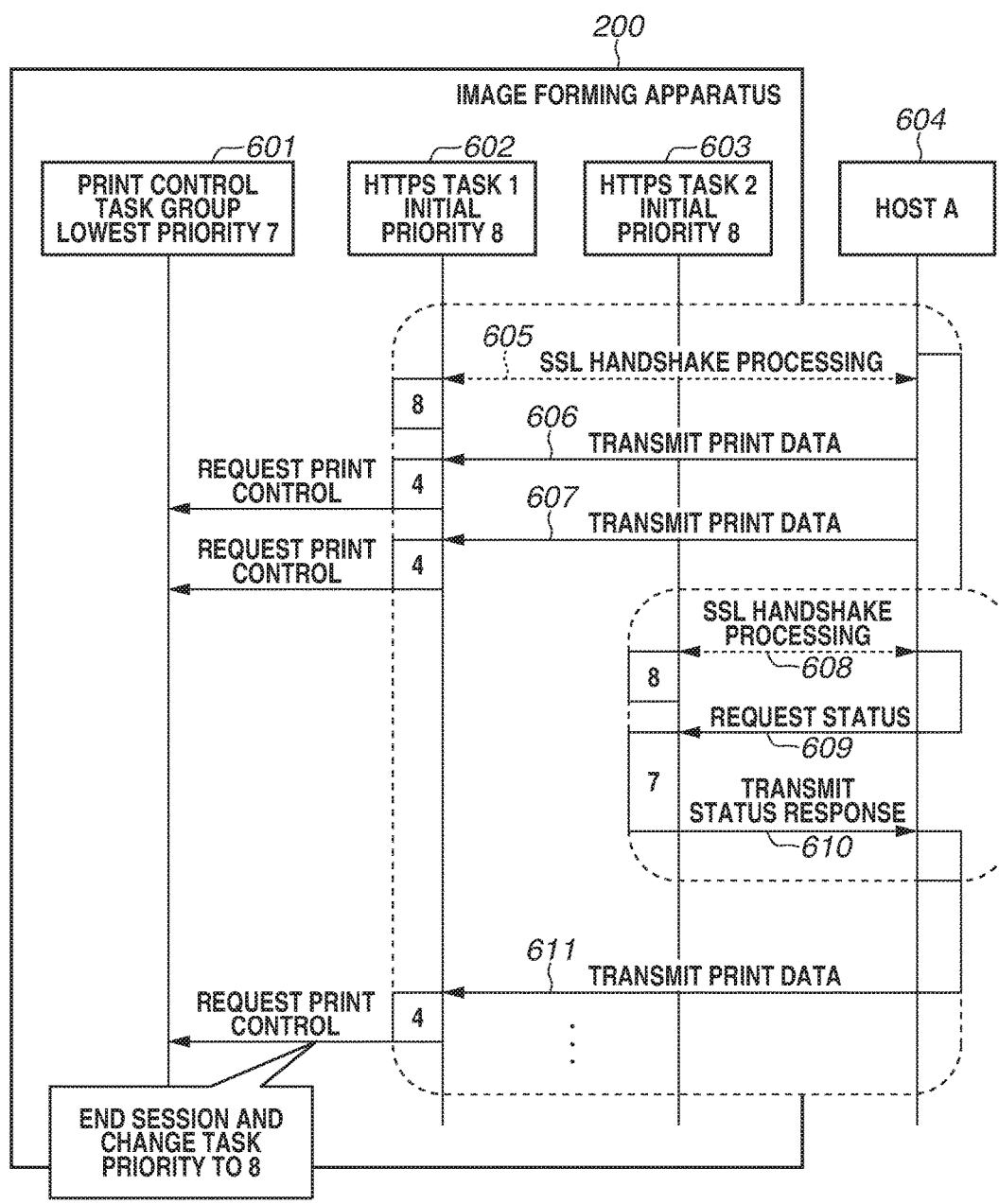

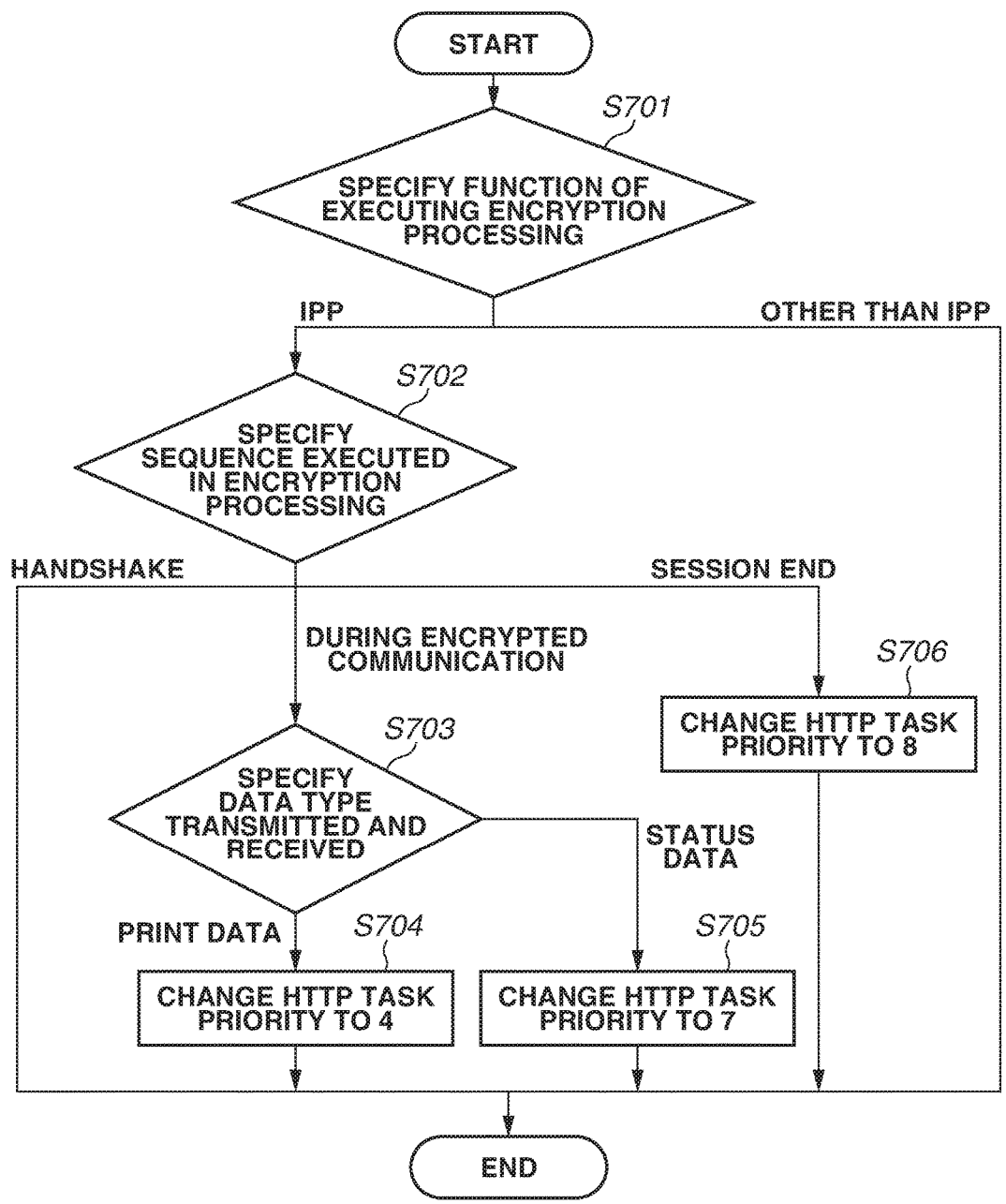

PRINT CONTROL APPARATUS, CONTROL METHOD AND STORAGE MEDIUM FOR CONTROLLING ENCRYPTED COMMUNICATION AND PRINT PROCESSING

BACKGROUND OF THE INVENTION

Field of the Invention

The aspect of the embodiments relates to a print control apparatus including a communication interface and a control method and a program thereof.

Description of the Related Art

The use of Secure Sockets Layer (SSL) communication using certificates has expanded recently in network environments. Opportunities to use the SSL communication have increased in built-in apparatuses such as print control apparatuses in communication for confirmation of apparatus statuses, secure print, and the like.

In the SSL communication, for example, key lengths are increased, and encryption types are changed to the ones which are more complicated and require more central processing unit (CPU) resources, and thus processing times related to the SSL communication tend to increase year after year.

Japanese Patent Application Laid-Open No. 2017-69756 describes execution of SSL communication by a print control apparatus.

When a print control apparatus executes processing related to the SSL communication and print processing in parallel, the print processing is likely to be delayed by the influence of the processing related to the SSL communication. However, Japanese Patent Application Laid-Open No. 2017-69756 does not describe a solution of the delay in the print processing when the processing related to the SSL communication and the print processing are executed in parallel. Thus, the aspect of the embodiments is directed to reduction of delay in print processing when processing related to SSL communication and print processing are executed in parallel.

SUMMARY OF THE INVENTION

A print control apparatus includes a communication control unit configured to control encrypted communication and a print control unit configured to control print processing, wherein, in a case where an encrypted common key is decrypted, the communication control unit is assigned with a first priority, and the print control unit is assigned with a second priority higher than the first priority, and wherein resource distribution of the print control apparatus with respect to the communication control unit and the print control unit is determined according to the priorities.

Further features of the disclosure will become apparent from the following description of exemplary embodiments with reference to the attached drawings.

BRIEF DESCRIPTION OF THE DRAWINGS

FIG. 6 is a detailed flowchart illustrating print processing according to the first exemplary embodiment of the disclosure.

FIG. 7 is a flowchart of a task priority switching unit according to the disclosure.

DESCRIPTION OF THE EMBODIMENTS

An example of a first exemplary embodiment according to the disclosure is described in detail below with reference to the attached drawings. However, unless otherwise specified, the scope of the disclosure is not limited only to a relative arrangement of components, a display screen, and the like described in the present exemplary embodiment. In addition, the components may be modified without departing from the scope of the exemplary embodiment.

Figure 1:
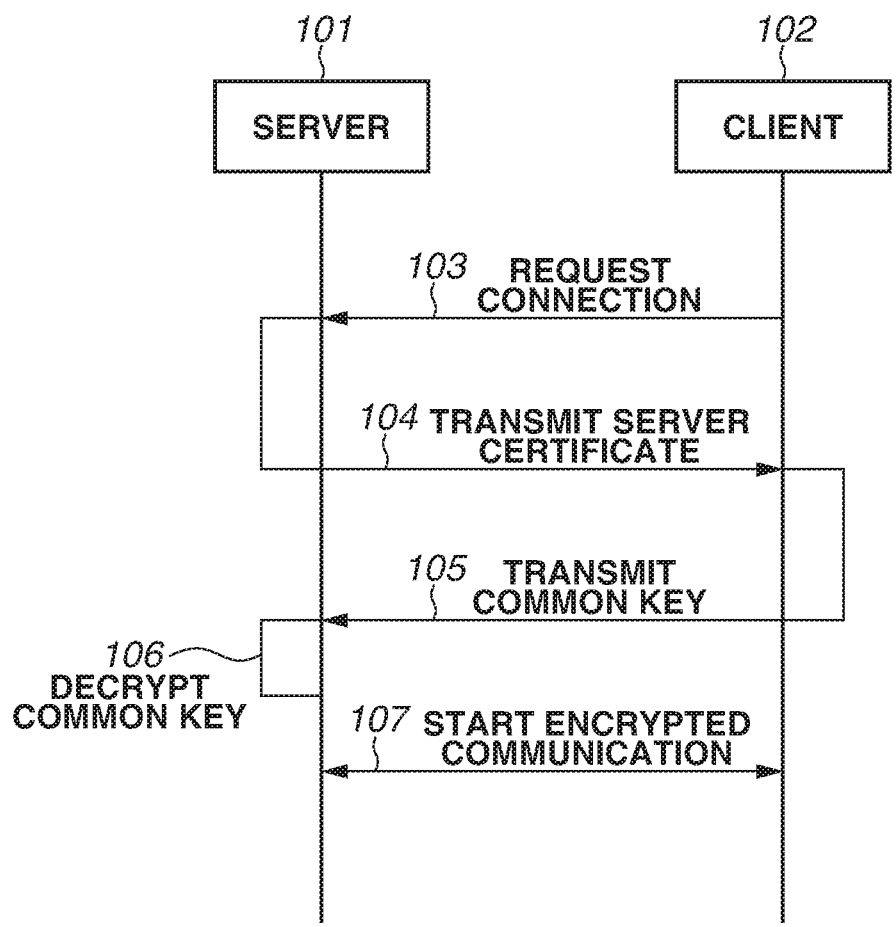
FIG. 1 is a sequence diagram illustrating Secure Sockets Layer (SSL) communication.

First, processing related to Secure Sockets Layer (SSL) communication is described with reference to FIG. 1. An SSL server apparatus 101 (corresponding to a print control apparatus, also referred to as an image forming apparatus, according to the present exemplary embodiment) and an SSL client apparatus 102 are connected to each other via a network by a user.

Subsequently, the SSL client apparatus 102 starts SSL communication with respect to the SSL server apparatus 101. Processing 103 is a connection request of the SSL communication, and the SSL client apparatus 102 notifies the SSL server apparatus 101 of an available encryption method list and an available compression method list. In processing 104, the SSL server apparatus 101 transmits a server certificate including a public key. In the processing 104, a protocol version to be used, an encryption method to be used, and a compression method to be used may be notified. In processing 105, the SSL client apparatus 102 transmits a common key to be used in the SSL communication. In the processing 105, the SSL client apparatus 102 generates the common key and encrypts the common key using the public key received in the processing 104. Further, the SSL client apparatus 102 transmits the encrypted common key in the processing 105. After the processing 105, in processing 106, the SSL server apparatus 101 decrypt the encrypted common key using a secret key. According to the present exemplary embodiment, the processing 103 to 106 is referred to as SSL handshake processing.

After the processing 106, the SSL server apparatus 101 and the SSL client apparatus 102 are in a state of storing the SSL common key and thus, in processing 107, can perform the SSL communication with each other by encrypting data by the common key. The SSL handshake processing uses a large amount of central processing unit (CPU) resources in generation, encryption, and decryption of the above-described common key.

<System Configuration>

Figure 2:
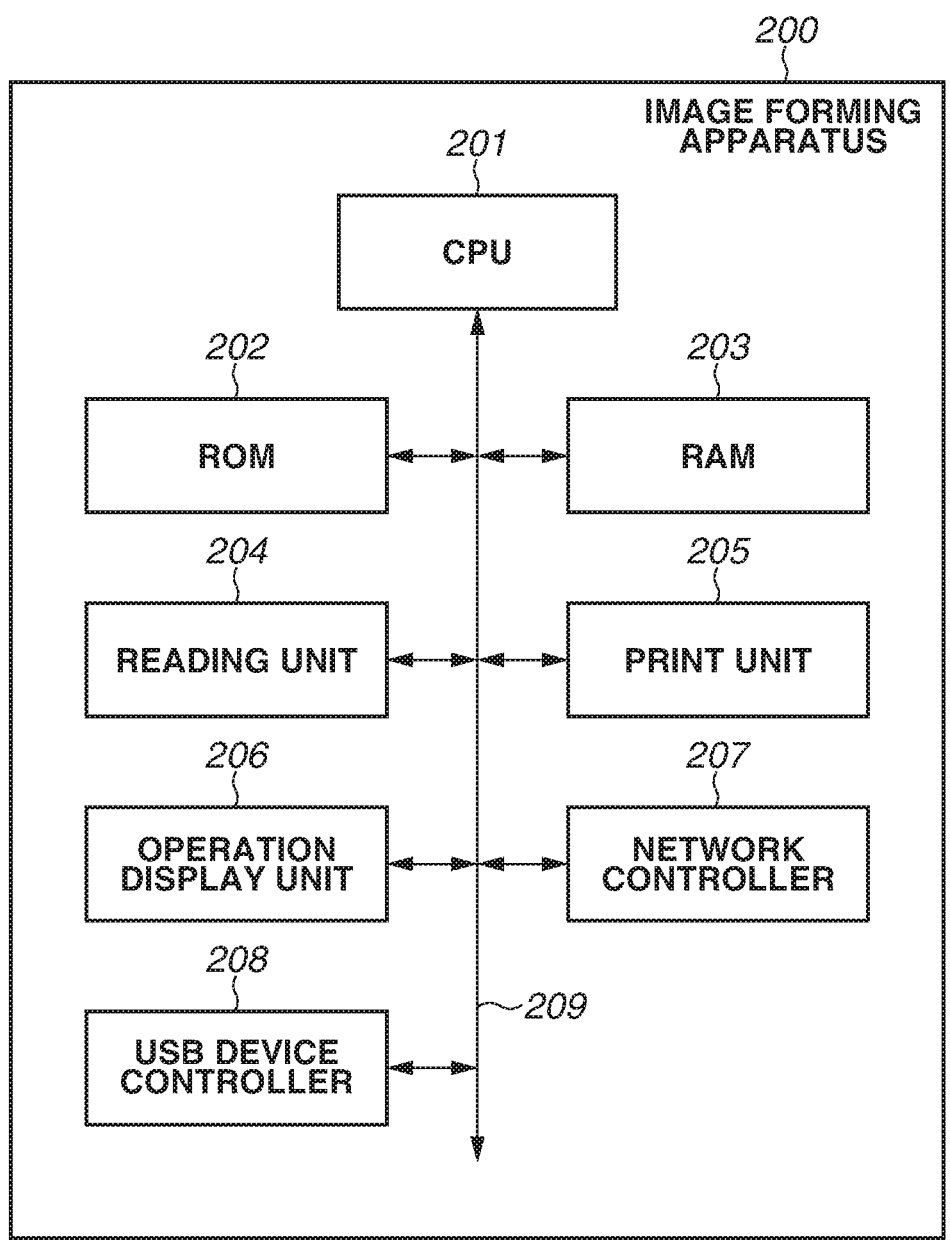
FIG. 2 is a block diagram illustrating hardware of an image forming apparatus.

First, a system configuration for realizing each exemplary embodiment described below is described with reference to FIGS. 2 and 3. FIG. 2 illustrates an image forming apparatus according to an exemplary embodiment of the disclosure. A CPU 201 entirely controls the apparatus according to a program stored in a read-only memory (ROM) 202. A random access memory (RAM) 203 is used as a work area for executing a program read from the ROM 202 and as a buffer in data transmission and reception. A reading unit 204 reads a document in paper or in a film placed on a document platen and generates image data. The reading unit 204 includes a scanner head which includes a reading sensor and has a reading width corresponding to a maximum readable width and scans a document with the scanner head to generate image data (scanned data). A print unit 205 includes a print head and ink tanks of each color and prints an image on a sheet, such as a print sheet, by ejecting inks in the ink tanks via the print head. An operation display unit 206 includes keys such as character input keys, a cursor key, an enter key, and a delete key, light-emitting diodes (LEDs), and a liquid crystal display (LCD), and a user can start various functions and perform various setting as the image forming apparatus through the operation display unit 206. The operation display unit 206 may include a touch panel. A network controller 207 is configured to be able to connect to and communicate with a plurality of devices by a wired local area network (LAN) such as Ethernet or a wireless LAN. A Universal Serial Bus (USB) device controller 208 which controls communication of a USB interface connects to a USB device and controls communication therewith according to the USB communication standard. The above-described components 201 to 208 are connected to each other via a CPU bus 209.

Figure 3:
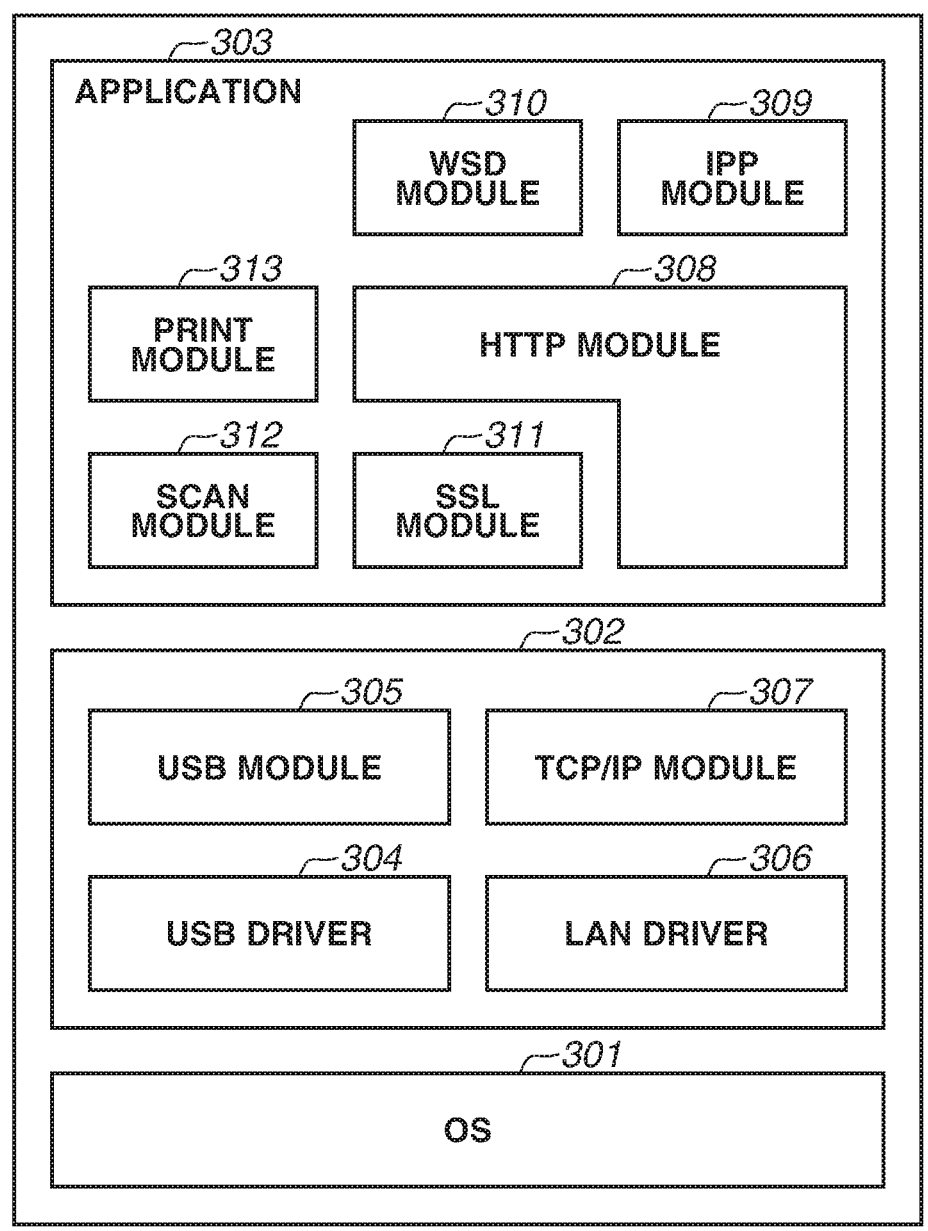
FIG. 3 is a block diagram illustrating software of an image forming apparatus.

FIG. 3 illustrates a module configuration of a program stored in the ROM 202 of the image forming apparatus according to the exemplary embodiment of the disclosure illustrated in FIG. 2. The program is classified into an operation system (OS) 301, a middleware layer 302, and an application layer 303 of the image forming apparatus. The middleware layer 302 is interposed between the OS 301 and a module group in the application layer 303 to control communication. A LAN driver 306 and a Transmission Control Protocol/Internet Protocol (TCP/IP) module 307 in the middleware layer 302 controls the network controller 207 to perform TCP/IP communication. A USB driver 304 and a USB module 305 controls the USB device controller 208 to perform USB communication. The application layer 303 includes a Hypertext Transfer Protocol (HTTP) module 308 and an Internet printing protocol (IPP) module 309. The application layer 303 further includes a Web Services for Devices (WSD) module 310, an SSL module 311, a scan module 312, and a print module 313. Generally, a network setting including an IP address and the like of the image forming apparatus can be executed not only from the operation display unit 206 but also by starting a web browser of a terminal device via the network and accessing to the image forming apparatus. The HTTP module 308 receives a setting request using the web browser from the terminal device via the network, obtains a web content from a content management module managing web contents, not illustrated, and transmits the web content to the terminal device. Accordingly, a setting screen for setting the network and the like is displayed on the web browser of the terminal device. The setting screen to be displayed on the web browser of the terminal device may be referred to as a remote user interface (UI). The HTTP module 308 is used for HTTP communication specified by a protocol using WSD, IPP, and other HTTPs. Further, the HTTP module 308 responds to Hypertext Transfer Protocol Secure (HTTPS) communication which performs communication via a protocol SSL and transport layer security (TLS) of a transport layer in which data can be transmitted and received by being encrypted using the SSL module 311. In addition, the HTTP module 308 responds to communication with a plurality of protocols and hosts by starting a plurality of HTTP server (HTTPS) tasks. The SSL module 311 performs authentication by the SSL and the TLS protocols, exchange of the common key, and encryption and decryption of data. When the HTTPS communication is used, web content data and data such as IPP and WSD used for control flowing in a communication path can be encrypted, and confidentiality can be improved. The scan module 312 controls execution of scanning when it is determined that data received via the USB communication or the network communication is a scan request as a result of analysis by the HTTP module 308, the IPP module 309, and the WSD module 310. The print module 313 controls execution of printing when it is determined that the data received via the USB communication or the network communication is a print request as a result of analysis by the HTTP module 308, the IPP module 309, and the WSD module 310.

According to the present exemplary embodiment, processing is described which is performed when the image forming apparatus receives an IPP request from the terminal device (a host).

The aspect of the embodiments is especially effective for the image forming apparatus which performs communication control and print control by a one-chip embedded processor of which a processing performance is limited. Further, the aspect of the embodiments is effective, for example, when print processing by the print module and the SSL communication processing by the SSL module are executed in parallel. More specifically, decryption processing of the encrypted common key is complicated in the SSL communication processing, and thus it is highly likely that a decryption processing time of the common key may be lengthened. When the processing by the print module and the processing by the SSL module have the same task priority and are executed in parallel, the CPU resources to be assigned to the print module may be reduced during when the SSL module executes the decryption processing of the common key. Accordingly, the print processing may be delayed.

According to each of the exemplary embodiments described below, an image forming apparatus 200 is connected to the host via the network controller 207, and communication paths between the image forming apparatus 200 and the host are all encrypted by SSL. Multi-task control by a real-time operating system (RTOS) is performed on control of each task, and task priorities range from a highest of 1 to a lowest of 10. The lowest priority of a print control task group executed by the print module 313 is 7. Encryption processing in the SSL module 311 is operated on a context of the HTTP module 308 as a use source. A priority of an HTTPS task is determined and changed by a task switching unit according to a flow in FIG. 7. An initial priority of the HTTPS task is 8. FIG. 7 illustrates a processing flow by the task switching unit which dynamically switches a task priority of an encryption processing execution task according to a function specification unit and a sequence specification unit, and the processing flow is described in detail below. Print data received by the HTTPS task is transmitted to the print control task group via the IPP module 309.

Figure 4:
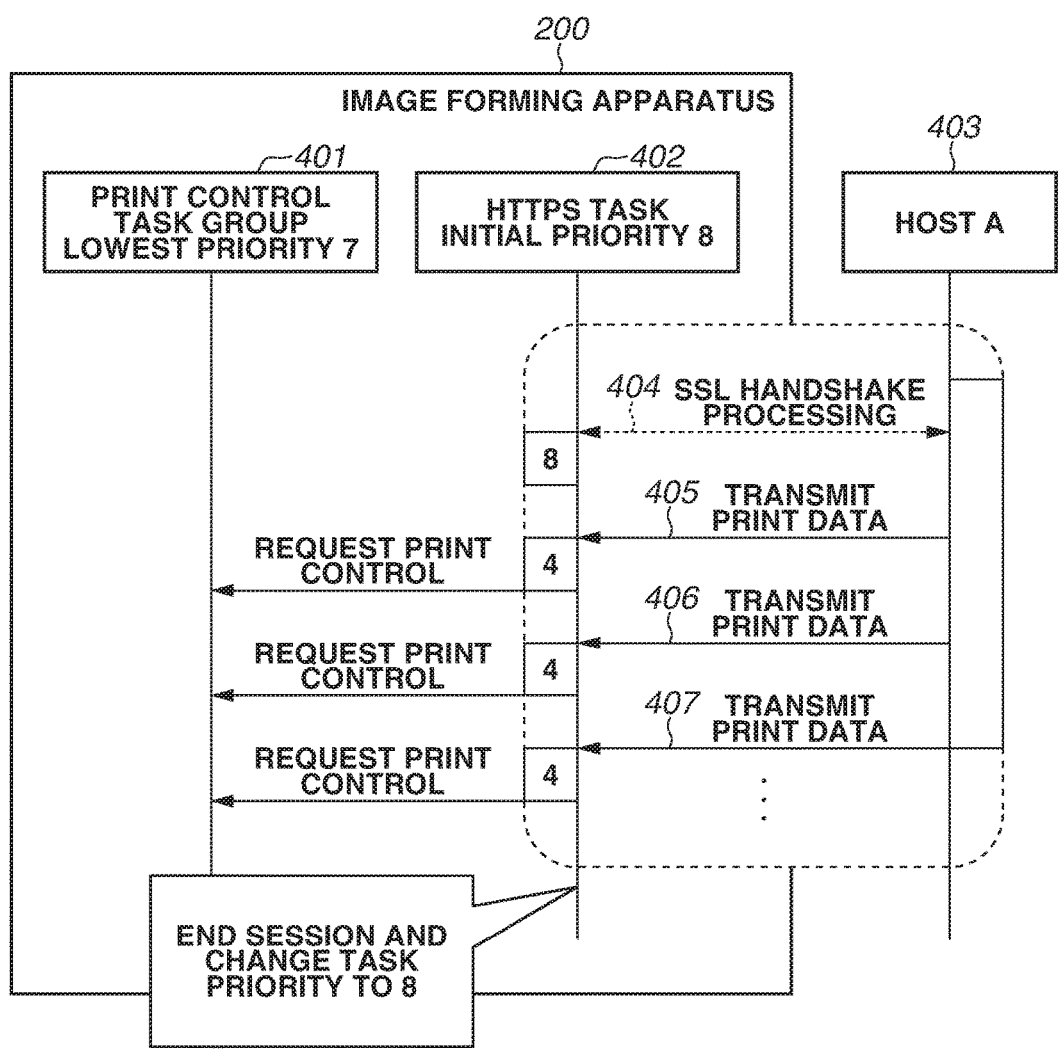
FIG. 4 is a flowchart illustrating print processing according to a first exemplary embodiment of the disclosure.

FIG. 4 illustrates a processing flow of a session when print data is received in IPP communication. An HTTPS task 402 detects an access to a port assigned to an IPP protocol and starts an IPP session. First, the HTTPS task 402 performs SSL handshake processing 404 between a host A 403 at the priority 8 and establishes the SSL communication.

After completion of the processing 404, in processing 405, the host A 403 transmits print data. After completion of the processing 405, the task switching unit performs determination according to the flow in FIG. 7 and changes the priority of the HTTPS task 402 to 4. After completion of the processing 405, in processing 406 and 407, the host A 403 transmits the print data in a row until transmission of the print data of a print job is completed. During reception processing of a series of print data pieces (the processing 405 to 407), the priority of the HTTPS task 402 is 4, and the received print data is decrypted, however, the decryption processing is to only decrypt the print data using the already generated common key. In other words, a CPU occupation time by the processing 405 to 407 is shorter compared to that of the SSL handshake processing 404 since the decryption processing of the encrypted common key is not necessary. The HTTPS task 402 requests the print control task group to control printing every time the print data is received.

After completion of the reception processing of the series of print data pieces (the processing 405 to 407), the task switching unit performs determination according to the flow in FIG. 7 and changes the priority of the HTTPS task 402 to 8.

Figure 5:
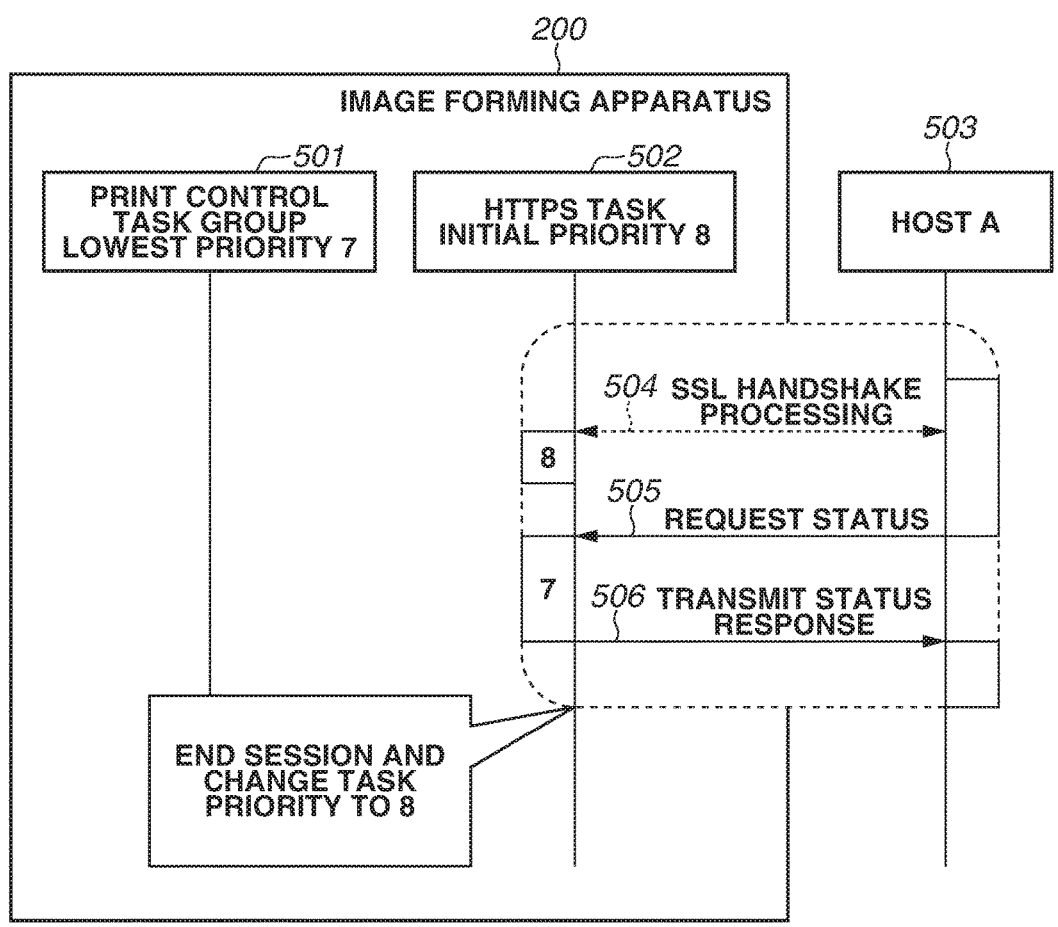
FIG. 5 is another flowchart illustrating print processing according to the first exemplary embodiment of the disclosure.

FIG. 5 is a flowchart illustrating a session when status data is transmitted in the IPP communication. An HTTPS task 502 detects an access to the port assigned to the IPP protocol and starts an IPP session. First, the HTTPS task 502 performs SSL handshake processing 504 between a host A 503 at the priority 8 and establishes the SSL communication. As an example of a timing when a status request is generated, there are a timing when a management application of the image forming apparatus stored in the host A is started and a timing when the management application regularly makes a request. In the case of print processing which is executed when the host transmits the print data, the host performs transmission of the print data and confirmation of the status of the image forming apparatus in parallel.

After completion of the processing 504, in processing 505, the host A 503 transmits a status request encrypted by using the common key stored in the handshake processing 504. After completion of the processing 505, the task switching unit performs determination according to the flow in FIG. 7 and changes the priority of the HTTPS task 502 to 7. After completion of the processing 505, in processing 506, the HTTPS task 502 transmits a status response encrypted using the common key stored in the handshake processing 504.

After completion of the processing 506, the task switching unit performs determination according to the flow in FIG. 7 and changes the priority of the HTTPS task 502 to 8.

FIG. 6 illustrates a detail flow of print processing in IPP communication. An HTTPS task 1 (602) detects an access to the port assigned to the IPP protocol and starts an IPP session. First, the HTTPS task 1 (602) performs SSL handshake processing 605 between a host A 604 at the priority 8 and establishes the SSL communication. After completion of the processing 605, in processing 606, the host A 604 transmits print data. After completion of the processing 606, the task switching unit performs determination according to the flow in FIG. 7 and changes the priority of the HTTPS task 1 (602) to 4. After completion of the processing 606, in processing 607 and 611, the host A 604 transmits the print data in a row until transmission of the print data of a print job is completed.

An HTTPS task 2 (603) detects an access to the port assigned to the IPP protocol and starts an IPP session. First, the HTTPS task 2 (603) performs SSL handshake processing 608 between the host A 604 at the priority 8 and establishes the SSL communication. The common key stored in the SSL handshake executed in the processing 605 is different from the common key stored in the SSL handshake executed in the processing 608.

During the print processing executed when the host transmits the print data, the host preforms transmission of the print data and confirmation of the status of the image forming apparatus in parallel. Thus, the print processing and the SSL handshake processing are increasingly likely to be executed in parallel. Therefore, the priority of the HTTPS task 2 (603) executing the SSL handshake processing 608 is set to the priority (8) lower than the priority (7) of the print control task group 601. Accordingly, the CPU resources are more assigned to the print control task group 601 than the HTTPS task 2 (604). In other words, resource distribution of the image forming apparatus is determined according to the priority, so that the CPU resources are more assigned to processing of the print control task group than processing of the HTTPS task when the processing of the HTTPS task and the processing of the print control task group are executed in parallel. Accordingly, delay in the print processing can be reduced. After completion of the processing 608, in processing 609, the host A 604 transmits a status request. After completion of the processing 609, the task switching unit performs determination according to the flow in FIG. 7 and changes the priority of the HTTPS task 2 (603) to 7. After completion of the processing 609, in processing 610, the HTTPS task 2 (603) transmits a status response.

After completion of the processing 610, the task switching unit performs determination according to the flow in FIG. 7 and changes the priority of the HTTPS task 2 (603) to 8.

During reception processing of a series of print data pieces (the processing 606, 607, and 611), the HTTPS task 1 (602) decrypts the received print data at the priority 4, however, the decryption processing of the encrypted common key is not necessary, and thus the CPU occupation time is shorter compared to that of the SSL handshake processing. After completion of the reception processing of the series of print data pieces (the processing 606, 607, and 611), the task switching unit performs determination according to the flow in FIG. 7 and changes the priority of the HTTPS task 1 (602) to 8.

FIG. 7 is the flowchart illustrating the processing of the task switching unit which dynamically switches the task priority of the encryption processing execution task according to the function specification unit and the sequence specification unit. The processing in the flowchart is started when a communication request is generated to a port of a communication protocol which can dynamically switch the task priority. The processing in the flowchart according to the present exemplary embodiment is realized by the CPU 201 reading and executing a program related to the flowchart from the RAM 203.

First, the CPU 201 assigns, for example, the task priority 8 to the HTTPS task and the task priority 7 to the print control task group as default values when the image forming apparatus 200 is started. These values are merely examples, and other task priorities may be assigned as long as the print control task group has a higher priority value. A timing for assigning the default value may be, for example, not when the image forming apparatus 200 is started but a timing when the HTTPS task is started because of communication processing after the start of the image forming apparatus 200.

In step S701, the CPU 201 specifies a protocol from a port number from which connection is requested.

When the protocol is other than the IPP (OTHER THAN IPP in step S701), the CPU 201 does not change the priority of the HTTPS task. Whereas, when the protocol is the IPP protocol (IPP in step S701), in step S702, the CPU 201 specifies a sequence (also referred to as a processing content) to be executed in the encryption processing. More specifically, the CPU 201 can specify the processing content to be executed by analyzing a content of a signal requested from the host to the HTTPS task.

When the sequence to be executed in the encryption processing is handshake (HANDSHAKE in step S702), the CPU 201 does not change the priority of the HTTPS task. In other words, the HTTPS task executes the handshake processing at the above-described initially set task priority.

When it is during encrypted communication (DURING ENCRYPTED COMMUNICATION in step S702), in step S703, the CPU 201 specifies a data type to be transmitted and received. More specifically, the CPU 201 can determine the data type by analyzing the content of the signal requested from the host to the HTTPS task.

When the data type to be transmitted and received is print data (PRINT DATA in step S703), in step S704, the CPU 201 changes the priority of the HTTPS task to 4. In other words, when the processing in step S704 is executed, the priority assigned to the HTTPS task is 4.

Whereas, when the data type is status data (STATUS DATA in step S703), in step S705, the CPU 201 changes the priority of the HTTPS task to 7. In other words, when the processing in step S705 is executed, the priority assigned to the HTTPS task is 7. A reason why the priority when the data type is the print data is different from the priority when the data type is the status data is described. When the data type is the print data, the HTTPS task executes the decryption processing on the print data and transmits a decrypted result to the print control task group. In other words, if the decryption processing by the HTTPS task is delayed, it may be likely that the print processing is not properly advanced. Thus, when the data type is the print data, the priority higher than that of the print control task group is set to the HTTPS task. Accordingly, an issue can be solved that the print processing cannot be advanced since the print control task group cannot receive the decrypted print data. On the other hand, when the data type is the status data, the print control task group does not use data generated by the HTTPS task group, and thus it is not necessary to set the priority higher than the priority (4) when the print data is processed. A processing time of the status request and the status response executed by the HTTPS task is shorter than a processing time of the decryption processing and the SSL handshake processing of the print data. Thus, an influence of the status request and the status response executed by the HTTPS task on the print control task is less compared to the decryption processing executed by the HTTPS task.

Next, when the processing content specified in step S702 is end of the session (SESSION END in step S702), in step S706, the CPU 201 changes the priority of the HTTPS task to 8. In other words, when the processing in step S706 is executed, the priority assigned to the HTTPS task is 8.

Start and determination processing (in steps S701, S702, and S703) and priority change processing (in steps S704, S705, and S706) for realizing the flow in FIG. 7 may be distributed to a plurality of tasks or may be aggregated to a single task. For example, a condition determination in step S701 and a condition determination in step S703 may be respectively arranged to the HTTP module 308 and the IPP module 309. In this regard, the processing in step S701 may be executed based on, for example, a port number in which a request is generated when an HTTP task is started. Further, in step S703, the data type may be determined, for example, from data transmitted and received by the IPP module. Values of the priority described in the exemplary embodiment are merely examples, and the priorities may be any values as long as relative levels of the priorities can be maintained.

By the processing according to the present exemplary embodiment, the lowest task priority of the print control task group is set higher than the priority of the HTTPS task when the high-load SSL handshake is performed. Accordingly, the encryption processing in the SSL module will not occupy the CPU resources, and delay can be reduced in processing such as notification of an internal status of the image forming apparatus and print control by the print control task group operating on the print module 313.

In addition, the decryption processing when the above-described print data is received is performed at the priority 4, and thus delay in the print data reception is similarly reduced. Accordingly, throughput of print processing can be entirely improved. The priority is dynamically changed according to a function and a sequence as described in the present exemplary embodiment, so that an overhead associated with encrypted communication can be reduced, and even an apparatus having lower specification can exercise an engine performance.

For example, when the aspect of the embodiments is applied to the case in which the image forming apparatus 200 receives a remote scan request from a terminal device, the lowest priority of a task group executed by the scan module 312 is set to 7. In addition, the task priority switching unit similar to that according to the first exemplary embodiment may set the priority of the HTTPS task during the SSL handshake processing to 8. Accordingly, the encryption processing in the SSL module will not occupy the CPU resources, so that delay in processing by a scan control task group operating on the scan module 312 can be reduced, and throughput can be entirely improved as with the first exemplary embodiment.

Further, for example, in the case in which the image forming apparatus receives a remote UI request from a terminal device in parallel when receiving an IPP request from another terminal device, a plurality of HTTPS tasks for processing the remote UI request performs the SSL handshake processing. The remote UI request is an HTTP request to the image forming apparatus via the web browser and the like. When the task priority for executing the encryption processing is fixed, the CPU resources are occupied by the encryption processing during the SSL handshake processing which is performed for a plurality of times, so that engine processing is partly delayed, and throughput is lowered. In order to apply the aspect of the embodiments to this case, the lowest priority of the print control task group executed by the print module 313 is set to 7. Further, the task priority switching unit similar to that according to the first exemplary embodiment may analyze a function and a sequence and set the priority of the HTTPS task in each SSL handshake processing to 8. Accordingly, the encryption processing in the SSL module will not occupy the CPU resources, so that delay in processing by the print control task group operating on the print module 313 can be reduced, and the throughput can be entirely improved as with the first exemplary embodiment.

Further, for example, the aspect of the embodiments is applied to the case in which the image forming apparatus receives a remote scan request from a terminal device at the same time when receiving an IPP request from another terminal device. In this case, the lowest priority 7 is set to the scan control task group executed by the scan module 312 and the print control task group executed by the print module 313. Further, the task priority switching unit similar to that according to the first exemplary embodiment may analyze a function and a sequence and set the priority of the HTTPS task in the SSL handshake processing to 8. Accordingly, the encryption processing in the SSL module will not occupy the CPU resources, so that delay in processing by the scan control task group and the print control task group can be reduced, and throughput can be entirely improved as with the first exemplary embodiment.

According to the aspect of the embodiments, when processing related to the SSL communication and print processing are executed in parallel, delay in the print processing can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-119068, filed Jun. 16, 2017, which is hereby incorporated by reference herein in its entirety.

What is claimed is:

1. An apparatus comprising:
a communication control unit configured to control encrypted communication; and
a print control unit configured to control print processing,
wherein, in a case where an encrypted common key is decrypted, the communication control unit is assigned with a first priority, and the print control unit is assigned with a second priority higher than the first priority, and
wherein resource distribution of the with respect to the communication control unit and the print control unit is determined according to the priorities.

2. The apparatus according to claim 1,
wherein, in a case where the communication control unit decrypts an encrypted common key, the communication control unit is assigned with the first priority, and
wherein, in a case where the communication control unit decrypts print data encrypted using the common key, the communication control unit is assigned with a third priority higher than the second priority.

3. The apparatus according to claim 1,
wherein, in a case where the communication control unit decrypts an encrypted common key, the communication control unit is assigned with the first priority, and
wherein, in a case where the communication control unit provides a status of the apparatus which is encrypted using the common key as a response, the communication control unit is assigned with a fourth priority higher than the first priority.

4. The apparatus according to claim 3, wherein the fourth priority is the same as the second priority.

5. The apparatus according to claim 1, wherein the encrypted communication is Secure Sockets Layer (SSL) communication.

6. The apparatus according to claim 1, wherein the communication control unit is assigned with the first priority as a priority in a case where handshake processing including processing for decrypting the encrypted common key is executed.

7. A method for controlling in an apparatus including a communication control unit configured to control encrypted communication and a print control unit configured to control print processing, the method comprising:
in a case where an encrypted common key is decrypted, assigning the communication control unit with a first priority and assigning the print control unit with a second priority higher than the first priority,
wherein resource distribution of the apparatus with respect to the communication control unit and the print control unit is determined according to the priorities.

8. The method according to claim 7, further comprising:
assigning the communication control unit with the first priority in a case where the communication control unit decrypts an encrypted common key; and
assigning the communication control unit with a third priority higher than the second priority in a case where the communication control unit decrypts print data encrypted using the common key.

9. The method according to claim 7, further comprising:
assigning the communication control unit with the first priority in a case where the communication control unit decrypts an encrypted common key; and
assigning the communication control unit with a fourth priority higher than the first priority in a case where the communication control unit provides a status of the apparatus which is encrypted using the common key as a response.

10. The method according to claim 9, wherein the fourth priority is the same as the second priority.

11. The method according to claim 7, wherein the encrypted communication is SSL communication.

12. The method according to claim 7, further comprising assigning the communication control unit with the first priority as a priority in a case where handshake processing including processing for decrypting the encrypted common key is executed.

13. A non-transitory storage medium storing a program for causing an apparatus, including a communication control unit configured to control encrypted communication and a print control unit configured to control print processing, to execute a method for controlling, the method comprising:

in a case where an encrypted common key is decrypted, assigning the communication control unit with a first priority and assigning the print control unit with a second priority higher than the first priority, wherein resource distribution of the print control apparatus with respect to the communication control unit and the print control unit is determined according to the priorities.

14. The non-transitory storage medium according to claim 13, wherein, in a case where the communication control unit decrypts an encrypted common key, the communication control unit is assigned with the first priority, and wherein, in a case where the communication control unit decrypts print data encrypted using the common key, the communication control unit is assigned with a third priority higher than the second priority.

15. The non-transitory storage medium according to claim 13, wherein, in a case where the communication control unit decrypts an encrypted common key, the communication control unit is assigned with the first priority, and wherein, in a case where the communication control unit provides a status of the print control apparatus which is encrypted using the common key as a response, the communication control unit is assigned with a fourth priority higher than the first priority.

16. The non-transitory storage medium according to claim 15, wherein the fourth priority is the same as the second priority.

17. The non-transitory storage medium according to claim 13, wherein the encrypted communication is SSL communication.

18. The non-transitory storage medium according to claim 13, wherein the communication control unit is assigned with the first priority as a priority in a case where handshake processing including processing for decrypting the encrypted common key is executed.

* * * * *